US012577629B2

(12) United States Patent
Kawashiri et al.

(10) Patent No.: US 12,577,629 B2
(45) Date of Patent: Mar. 17, 2026

(54) RESIDUAL LIQUID AMOUNT DETECTION METHOD AND DETECTION APPARATUS FOR THE SAME, RESIDUAL MOLTEN MATERIAL AMOUNT DETECTION METHOD AND DETECTION APPARATUS FOR THE SAME, AND METHOD FOR OPERATING VERTICAL FURNACE

(71) Applicant: JFE STEEL CORPORATION, Tokyo (JP)

(72) Inventors: Yuki Kawashiri, Tokyo (JP); Tetsuya Yamamoto, Tokyo (JP); Taihei Nouchi, Tokyo (JP); Kazuhira Ichikawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 445 days.

(21) Appl. No.: 18/274,853

(22) PCT Filed: Jan. 13, 2022

(86) PCT No.: PCT/JP2022/000871
§ 371 (c)(1),
(2) Date: Jul. 28, 2023

(87) PCT Pub. No.: WO2022/168556
PCT Pub. Date: Aug. 11, 2022

(65) Prior Publication Data
US 2024/0132982 A1      Apr. 25, 2024

(30) Foreign Application Priority Data
Feb. 3, 2021      (JP) .............................. JP2021-015651

(51) Int. Cl.
*C21B 7/24* (2006.01)
*B22D 2/00* (2006.01)
(Continued)

(52) U.S. Cl.
CPC ................ *C21B 7/24* (2013.01); *B22D 2/003* (2013.01); *G01F 23/22* (2013.01); *F27D 21/0028* (2013.01)

(58) Field of Classification Search
CPC . G01F 23/22; C21B 7/24; B22D 2/003; F27B 1/28; F27D 21/0028; C03B 5/245
See application file for complete search history.

(56) References Cited

U.S. PATENT DOCUMENTS

| | | | |
|---|---|---|---|
| 6,125,918 A | 10/2000 | Berge | |
| 6,576,039 B2 | 6/2003 | Koffron et al. | |
| 2015/0218667 A1 | 8/2015 | Ojeda Arroyo et al. | |

FOREIGN PATENT DOCUMENTS

| | | |
|---|---|---|
| CN | 108728600 A | 11/2018 |
| CN | 110628974 A | 12/2019 |

(Continued)

OTHER PUBLICATIONS

Mar. 13, 2024 Office Action issued in Russian Patent Application No. 2023119761.

(Continued)

*Primary Examiner* — Herbert K Roberts
(74) *Attorney, Agent, or Firm* — OLIFF PLC

(57) ABSTRACT

A residual molten material amount detection method and detection apparatus that can detect a residual amount of molten material in a vertical furnace and a method for operating a vertical furnace by using the detection method. The residual molten material amount detection method detects a residual amount of molten material remaining in a bottom portion of a vertical furnace after end of discharge of the molten material. The method includes detecting the residual amount of the molten material by using a difference between a production speed of the molten material and a discharge speed of the molten material that is calculated by (Continued)

using a discharge acceleration, a discharge period, and an initial discharge speed of the discharge of the molten material through a taphole.

11 Claims, 2 Drawing Sheets

(51) Int. Cl.
*G01F 23/22* (2006.01)
*F27D 21/00* (2006.01)

(56) References Cited

FOREIGN PATENT DOCUMENTS

| | | | |
|----|--------------|----|---------|
| JP | S59-127609 | A | 7/1984 |
| JP | H05-156331 | A | 6/1993 |
| JP | H07150210 | A | 6/1995 |
| JP | H08-277404 | A | 10/1996 |
| JP | H1137819 | A | 2/1999 |
| JP | 2006-176805 | A | 7/2006 |
| JP | 2017-160498 | A | 9/2017 |
| JP | 2020063898 | A | 4/2020 |
| KR | 19980047656 | A | 9/1998 |
| KR | 10-2102470 | B1 | 5/2020 |
| RU | 2001117 | C1 | 10/1993 |
| RU | 2 137 573 | C1 | 9/1999 |
| RU | 2 678 549 | C2 | 1/2019 |
| SU | 1580175 | A1 | 7/1990 |
| TW | I700372 | B | 8/2020 |
| WO | 2019132495 | A1 | 7/2019 |

OTHER PUBLICATIONS

Sep. 11, 2025 Office Action issued in Chinese Patent Application No. 202280011780.2 (with concise explanation of relevance).

Oct. 13, 2022 Office Action issued in Taiwanese Patent Application No. 111102795 (with partial translation as concise explanation of relevance in English).

May 24, 2024 Office Action issued in European Application No. 22749433.3.

Aug. 27, 2025 Written Decision on Registration issued in Korean Patent Application No. 10-2023-7025336.

Feb. 15, 2022 International Search Report issued in International Patent Application No. PCT/JP2022/000871.

RESIDUAL LIQUID AMOUNT DETECTION METHOD AND DETECTION APPARATUS FOR THE SAME, RESIDUAL MOLTEN MATERIAL AMOUNT DETECTION METHOD AND DETECTION APPARATUS FOR THE SAME, AND METHOD FOR OPERATING VERTICAL FURNACE

TECHNICAL FIELD

This application relates to residual liquid amount detection method and detection apparatus for the same, residual molten material amount detection method and apparatus for detecting a residual amount of molten material in a vertical furnace, and a method for operating a vertical furnace.

BACKGROUND

For example, in a vertical furnace such as a blast furnace, iron ore and coke, which are raw materials, are charged into the blast furnace through a furnace top, and a hot blast is blown into the furnace through a tuyere provided in a lower portion of the furnace. The coke is burned by the hot blast blown into the furnace through the tuyere, and thereby high-temperature reducing gas is generated. This high-temperature reducing gas melts and reduces the iron ore, and thereby molten pig iron is produced. The molten pig iron and molten slag (hereinafter sometimes referred to as "slag") obtained as a by-product when the molten pig iron is produced are accumulated in a bottom portion of the furnace and are discharged through a taphole periodically.

In operation of such a blast furnace, obtaining a residual amount and a liquid level of molten material such as molten pig iron and slag accumulated in the bottom portion of the blast furnace is important in deciding a tapping cycle and performing stable and economical operation. When the residual amount of the molten material increases and the liquid level of the molten material becomes too high, it is sometimes impossible to maintain stable operation due to a large fluctuation in blast pressure. Furthermore, when the liquid level of the molten material rises to a position close to the tuyere, the tuyere is blocked by the slag, and in the worst case, the furnace becomes inoperable. To stabilize the blast furnace that has become unstable due to a too high liquid surface of the molten material, it is necessary to take measures such as increasing an amount of coke charged through the furnace top and changing an amount of hot blast blown into the furnace through the tuyere. This invites an increase in cost for operation of the blast furnace.

The residual amount of the molten material in the blast furnace can be roughly estimated from a material balance between an amount of produced molten pig iron slag and an amount of molten pig iron slag discharged through the taphole. For example, the amount of produced molten pig iron slag can be obtained from an amount of burden charged through the furnace top per unit time and a component concentration of the burden. The amount of molten pig iron slag discharged through the taphole can be obtained by measurement of a weight of a torpedo car for storing molten pig iron and measurement of a weight of granulated slag produced from slag. By calculating a difference between the amount of produced molten pig iron slag and the amount of discharged molten pig iron slag thus obtained, the residual amount of the molten material in the blast furnace can be estimated.

However, according to the above method, a residual amount of molten material can be estimated only once every tapping operation. The molten material tapping operation is performed approximately one time every approximately two to three hours. Therefore, in a case where an operating action is taken while using the residual amount of the molten material as an index, there is a possibility that a trouble becomes serious due to a delay in dealing with the trouble since the index can be obtained only one time every two to three hours. It is therefore very important to be able to acquire a residual amount of molten material at any timing from a perspective of avoiding a trouble of a blast furnace.

As a technique for acquiring a residual amount and a liquid level of molten material, Patent Literature 1 discloses a method for measuring a voltage by passing a current through an electrode provided on a side surface of a blast furnace and measuring a liquid level of molten material on the basis of the measured voltage. Patent Literature 2 discloses a method for imaging a flow of molten pig iron slag discharged through a taphole by using a camera, calculating a discharge speed of the molten pig iron slag from the image thus acquired, and estimating a residual amount of molten material in a blast furnace on the basis of the discharge speed.

CITATION LIST

Patent Literature

PTL 1: Japanese Unexamined Patent Application Publication No. 2006-176805
PTL 2: Japanese Unexamined Patent Application Publication No. 2017-160498

Non Patent Literature

NPL 1: "Physical and chemical data book for iron-and steelmaking", Ironmaking (2006), The Iron and Steel Institute of Japan, p. 437
NPL 2: Takashi SUGIYAMA and three others, "Analysis on Liquid Flow in the Dripping Zone of Blast Furnace", Tetsu-to-Hagane, Vol. 73 (1987), No. 15, pp. 2044-2051
NPL 3: Yusuke KASHIHARA and four others, "Effect of Unconsumed Mixed Small Coke on Permeability in Lower Part of Blast Furnace", Tetsu-to-Hagane, Vol. 102 (2016), No. 12, pp. 661-668
NPL 4: Taihei NOUCHI and two others, "Effects of Operation Condition and Casting Strategy on Drainage Efficiency of the Blast Furnace Hearth", Tetsu-to-Hagane, Vol. 92 (2006), No. 12, pp. 269-274

SUMMARY

Technical Problem

However, according to the methods disclosed in Patent Literature 1 and Patent Literature 2, a special sensor or camera for measuring electric resistance or a potential resulting from molten material in a blast furnace or a speed of a flow of discharged tapping molten pig iron slag needs to be disposed in an environment where dust and the like are generated. Therefore, these methods undesirably require not only an initial cost for introducing equipment such as the special sensor or camera, but also a maintenance cost for maintaining the equipment. The disclosed embodiments were accomplished in view of such a problem, and an object of the disclosed embodiments is to provide a residual molten material amount detection method and apparatus that can detect a residual amount of molten material in a vertical furnace at any timing without newly installing a special sensor or camera and a method for operating the vertical furnace by using the detection method. Another object of the disclosed embodiments is to provide residual liquid amount detection method and apparatus that can detect, at any timing, a residual amount of liquid not only in a vertical furnace, but in a container that is filled with a solid so that a solid-filled structure is formed.

Solution to Problem

A solution to the above problem is as follows.

[1] A residual liquid amount detection method for detecting a residual amount of a liquid remaining in a bottom portion of a container after the liquid is discharged through a discharge hole provided in a lower portion of the container, the container being filled with a solid so that a solid-filled structure is formed and the liquid being contained in the container so as to infiltrate voids in at least a part of the solid-filled structure, the residual liquid amount detection method including detecting the residual amount of the liquid by using a difference between a supply speed of the liquid and a discharge speed of the liquid that is calculated by using a discharge acceleration, a discharge period, and an initial discharge speed of the discharge of the liquid through the discharge hole.

[2] The residual liquid amount detection method according to [1], further including: calculating a void fraction of the solid-filled structure by using an inclination angle of a liquid surface of the liquid at end of the discharge of the liquid through the discharge hole; and detecting a liquid level of the liquid after the end of the discharge by using the calculated void fraction and the residual amount of the liquid after the end of the discharge.

[3] A residual molten material amount detection method for detecting a residual amount of molten material remaining in a bottom portion of a vertical furnace after end of discharge of the molten material, the vertical furnace generating high-temperature reducing gas by burning carbon by using oxygen-containing gas blown through a lower portion of the vertical furnace, producing the molten material by causing the high-temperature reducing gas to melt and reduce an iron source raw material that is charged through a furnace top of the vertical furnace and forms a solid-filled structure in the vertical furnace, and discharging the molten material through a taphole of the vertical furnace, the residual molten material amount detection method including detecting the residual amount of the molten material by using a difference between a production speed of the molten material and a discharge speed of the molten material that is calculated by using a discharge acceleration, a discharge period, and an initial discharge speed of the discharge of the molten material through the taphole.

[4] The residual molten material amount detection method according to [3], further including: calculating a void fraction of the solid-filled structure by using an inclination angle of a liquid surface of the molten material at the end of the discharge of the molten material through the taphole; and detecting a liquid level of the molten material after the end of the discharge by using the calculated void fraction and the residual amount of the molten material after the end of the discharge.

[5] A method for operating a vertical furnace, the method comprising, in a case where the liquid level detected by the residual molten material amount detection method according to [4] exceeds a predetermined threshold value, performing at least one of an operating action for lowering the production speed of the molten material and an operating action for increasing the discharge speed of the molten material.

[6] A residual liquid amount detection apparatus for detecting a residual amount of a liquid remaining in a bottom portion of a container after the liquid is discharged through a discharge hole provided in a lower portion of the container, the container being filled with a solid so that a solid-filled structure is formed and the liquid being contained in the container so as to infiltrate voids in at least a part of the solid-filled structure, the residual liquid amount detection apparatus including: a supply speed acquisition unit that acquires a supply speed of the liquid; a discharge speed acquisition unit that acquires a discharge speed of the liquid by using a discharge acceleration, a discharge period, and an initial discharge speed of the discharge of the liquid through the discharge hole; and a residual amount calculation unit that calculates the residual amount of the liquid by using a difference between the supply speed of the liquid and the discharge speed of the liquid.

[7] The residual liquid amount detection apparatus according to [6], further including a liquid level calculation unit that calculates a void fraction of the solid-filled structure by using an inclination angle of a liquid surface of the liquid at end of the discharge of the liquid through the discharge hole and detects a liquid level of the liquid after the end of the discharge by using the calculated void fraction and the residual amount of the liquid after the end of the discharge.

[8] A residual molten material amount detection apparatus for detecting a residual amount of molten material remaining in a bottom portion of a vertical furnace after end of discharge of the molten material, the vertical furnace generating high-temperature reducing gas by burning carbon by using oxygen-containing gas blown through a lower portion of the vertical furnace, producing the molten material by causing the high-temperature reducing gas to melt and reduce an iron source raw material that is charged through a furnace top of the vertical furnace and forms a solid-filled structure in the vertical furnace, and discharging the molten material through a taphole of the vertical furnace, the residual molten material amount detection apparatus including: a production speed acquisition unit that acquires a production speed of the molten material; a discharge speed acquisition unit that acquires a discharge speed of the molten material by using a discharge acceleration, a discharge period, and an initial discharge speed of the discharge of the molten material through the taphole; and a residual amount calculation unit that calculates the residual amount of the molten material by using a difference between the production speed of the molten material and the discharge speed of the molten material.

[9] The residual molten material amount detection apparatus according to [8], further including a liquid level calculation unit that calculates a void fraction of the solid-filled structure by using an inclination angle of a liquid surface of the molten material after the end of the discharge of the molten material through the taphole and detects a liquid level of the molten material after the end of the discharge by using the calculated void fraction and the residual amount of the molten material after the end of the discharge.

Advantageous Effects

According to the residual molten material amount detection method and detection apparatus for the same according to the disclosed embodiments, a residual amount of molten material in a vertical furnace can be detected at any timing without the need for an initial cost and a maintenance cost needed when a special sensor or camera is introduced. This makes it possible to perform an operating action based on a residual amount of molten material at a desired timing while suppressing an increase in production cost of molten pig iron, thereby making it possible to avoid troubles of a vertical furnace more than a conventional technique and realize stable operation of a vertical furnace.

DETAILED DESCRIPTION

The disclosed embodiments will be described below based on an embodiment. In the present embodiment, a blast furnace is used as a vertical furnace, and a method and an apparatus for detecting a residual amount of molten material in the blast furnace are described. However, residual molten material amount detection method and detection apparatus for the same according to the disclosed embodiments are applicable not only to a blast furnace, but also to any vertical furnace into which an iron source raw material and coke are charged through a furnace top and oxygen-containing gas is blown through a lower portion of the furnace to produce molten material and that discharges the molten material through a taphole.

Figure 1:
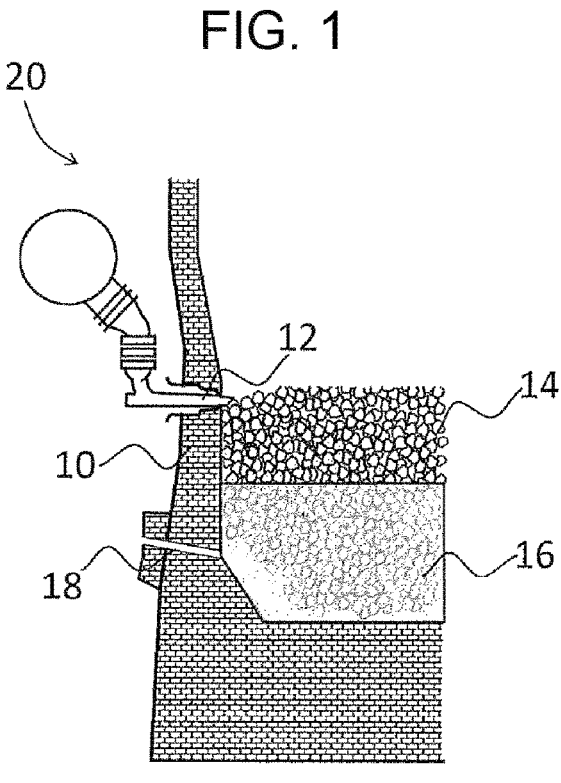
FIG. 1 is a cross-sectional view schematically illustrating a bottom portion of a blast furnace.

FIG. 1 is a cross-sectional view schematically illustrating a bottom portion of a blast furnace 20. Iron ore and coke, which are raw materials, are alternately charged into a furnace body 10 through a furnace top of the blast furnace 20 so as to form layers, and a hot blast, which is oxygen-containing gas, and a reductant such as pulverized coal are blown into the furnace body 10 through a tuyere 12 provided in a lower portion of the furnace body 10. Carbon contained in the coke and the pulverized coal is burned by the hot blast blown through the tuyere 12. This generates high-temperature reducing gas. The high-temperature reducing gas melts and reduces the iron ore, and thereby molten pig iron is produced. The high-temperature reducing gas used to melt and reduce the iron ore is then discharged as furnace top gas through the furnace top. The produced molten pig iron and slag produced as a by-product when the molten pig iron is produced are accumulated in a furnace bottom portion and is discharged through the taphole 18 every predetermined period. In the present embodiment, the molten pig iron and slag are collectively referred to as molten material 16. The iron ore is an example of an iron source raw material.

A solid-filled structure 14 filled with the coke charged through the furnace top is formed in the bottom portion of the furnace body 10. The molten material 16 accumulated in the bottom portion of the furnace body 10 fill voids in the solid-filled structure 14. In a case where a speed at which the molten material 16 is discharged through the taphole 18 is higher than a speed at which the molten material 16 is produced, a residual amount of the molten material 16 in the bottom portion gradually decreases. When the residual amount of the molten material 16 decreases to such an extent that a liquid level of the molten material 16 becomes the same as the height of the taphole 18, the high-temperature reducing gas starts to be ejected from the furnace. When the high-temperature reducing gas stars to be ejected through the taphole 18, it becomes difficult to discharge the molten material 16 through the taphole 18. Therefore, another taphole is opened and the taphole 18 through which the high-temperature reducing gas is ejected is closed, and thereby the molten material 16 is continuously discharged from the furnace body 10.

The residual molten material amount detection method and detection apparatus for the same according to the present embodiment calculate a production speed of the molten material 16 and a discharge speed of the molten material 16 in the blast furnace 20. Then, by calculating a difference between the production speed of the molten material 16 and the discharge speed of the molten material 16, a residual amount of the molten material 16 at any timing can be detected. In a case where the residual amount of the molten material 16 at any timing can be detected, not only can the residual amount of the molten material 16 be detected at a desired timing, but also the residual amount of the molten material 16 can be continuously detected.

Figure 2:
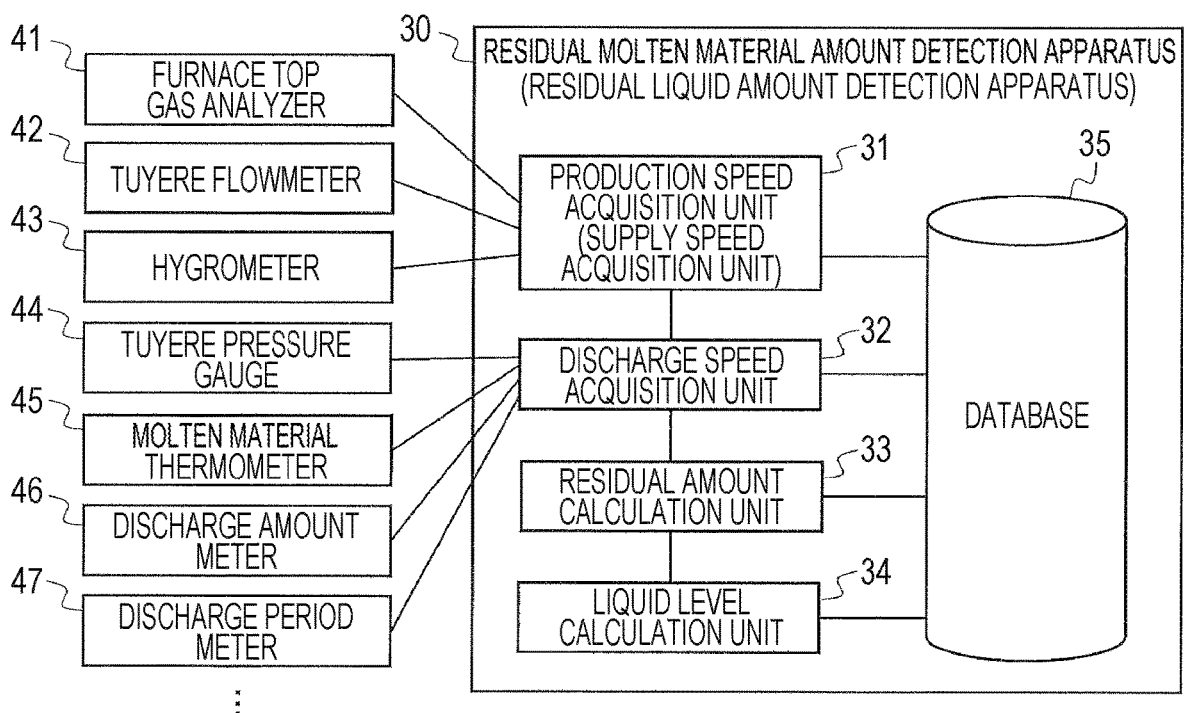
FIG. 2 is a block diagram of a residual amount detection apparatus.

FIG. 2 illustrates a configuration of a residual molten material amount detection apparatus 30 according to the present embodiment. As illustrated in FIG. 2, the residual molten material amount detection apparatus 30 includes a production speed acquisition unit 31 that acquires a production speed of the molten material 16, a discharge speed acquisition unit 32 that acquires a discharge speed of the molten material 16, and a residual amount calculation unit 33 that calculates a residual amount of the molten material 16. The residual molten material amount detection apparatus 30 further includes a liquid level calculation unit 34 that detects a liquid level of the molten material 16 after end of discharge. The production speed acquisition unit 31, the discharge speed acquisition unit 32, the residual amount calculation unit 33, and the liquid level calculation unit 34 are realized by a general-purpose computer or the like including a central processing unit (CPU) that processes information and a storage device and perform calculation that will be described later. The residual molten material amount detection apparatus 30 further includes a database 35 in which various values used for the calculation that will be described later are stored in advance.

First, a method for acquiring the production speed of the molten material 16 by the production speed acquisition unit 31 of the residual molten material amount detection apparatus 30 is described. A production speed PV of the molten material 16 is calculated from an amount of hot blast blown through the tuyere 12 and a component concentration of the hot blast, an amount of raw material charged through the furnace top and a chemical composition of the raw material, and an amount of furnace top gas discharged through the furnace top and a component concentration of the furnace top gas. Specifically, the production speed PV of the molten material 16 is calculated by the following formula (1):

[Math. 1]

$$PV = \frac{\left(TV \times F_o - \frac{BV \times E_o}{22.4} \times 2\right)}{OM} \times M_M \tag{1}$$

In the formula (1), PV is a production speed (kg/sec) of molten material. TV is a flow rate ($Nm^3$/sec) of furnace top gas. Fo is an amount concentration ($mol/Nm^3$) of 0 atoms in the furnace top gas. BV is a flow rate ($Nm^3/sec$) of hot blast blown through all tuyeres 12. $E_O$ is a volume fraction (–) of oxygen in the hot blast. OM (–) is a ratio of the number of oxygen atoms to the number of metal atoms per 1 mol of a material to be reduced among raw materials. $M_M$ is an atomic weight (g/mol) of the metal atoms. Note that (–) means being dimensionless.

The flow rate TV of the furnace top gas is calculated by the following formula (2).

$$TV=BV \times E_N/F_N \tag{2}$$

In the formula (2), TV is a flow rate ($Nm^3/sec$) of the furnace top gas. BV is a flow rate ($Nm^3/sec$) of the hot blast blown through the tuyere 12. $E_N$ is a volume fraction (–) of nitrogen in the hot blast. $F_N$ is a volume fraction (–) of nitrogen in the furnace top gas.

The amount concentration $F_O$ of the O atoms and the volume fraction $F_N$ of nitrogen in the furnace top gas are obtained by analyzing the furnace top gas by using a furnace top gas analyzer 41 by gas chromatography or infrared spectroscopy. The flow rate BV of the hot blast blown through all of the tuyeres 12 is obtained by flowmeters 42 provided in the tuyeres 12.

The volume fraction $E_O$ of oxygen in the hot blast can be calculated by the following formula (3). The volume fraction $E_N$ of nitrogen in the hot blast can be calculated by the following formula (4).

$$E_O=(X \times 0.21+Y)/(X+Y) \tag{3}$$

$$E_N=(X \times 0.79)/(X+Y) \tag{4}$$

In the formula (3) and (4), X is a flow rate ($Nm^3/sec$) of blown air. Y is a flow rate ($Nm^3/sec$) of blown oxygen.

The volume fraction $E_O$ of oxygen in the hot blast and the volume fraction $E_N$ of nitrogen in the hot blast may be calculated by the following formulas (5) and (6) in consideration of moisture in the air.

$$E_O=(X \times 0.21+Y)/[X+Y+X \times (Z/18) \times 22.4] \tag{5}$$

$$E_N=(X \times 0.79)/[X+Y+X \times (Z/18) \times 22.4] \tag{6}$$

In the above formulas (5) and (6), X is a flow rate ($Nm^3/sec$) of blown air. Y is a flow rate ($Nm^3/sec$) of blown oxygen. Z is moisture ($kg/m^3$) in the air. The moisture Z in the air is obtained by measuring the air by a hygrometer 43.

The ratio OM of the number of oxygen atoms to the number of metal atoms per 1 mol of a material to be reduced among raw materials is found from a component concentration of the raw materials measured by chemical analysis.

The molten material 16 is a mixture of a molten metal and other slag. It is therefore preferable to add a production speed of the slag to the production speed PV of the molten material 16 calculated by the above formula (1). In this case, a production speed of a molten oxide is found by calculating a mass ratio of the molten oxide to the molten metal from the component concentration of the raw materials and multiplying the production speed of the molten metal by the mass ratio.

Next, a method for acquiring a discharge speed of the molten material 16 by the discharge speed acquisition unit 32 of the residual molten material amount detection apparatus 30 is described. A discharge opening of the taphole 18 is gradually eroded by the molten material 16, and therefore a diameter of the discharge opening increases with passage of time. Accordingly, the discharge speed of the molten material 16 gradually increases. Since the discharge speed linearly increases with passage of time, the discharge speed v of the molten material 16 is calculated by the following formula (7).

[Math. 2]

$$v=v_0+a \times t \tag{7}$$

In the above formula (7), v is a discharge speed ($m^3/sec$) of the molten material 16. $v_0$ is an initial discharge speed ($m^3/sec$) of the molten material 16. t is a discharge period (sec). a is a discharge acceleration ($m^3/sec^2$). That is, in the present embodiment, the discharge speed v of the molten material 16 is calculated by using the discharge acceleration a, the discharge period t, and the initial discharge speed $v_0$ of the molten material 16.

Furthermore, a discharge amount V of the molten material 16 discharged during a discharge period T is calculated by the following formula (8).

[Math. 3]

$$V = \frac{1}{2}a \times T^2 + v_0 \times T \tag{8}$$

In the above formula (8), V is a discharge amount ($m^3$) of the molten material 16. T is a discharge period (sec). a is a discharge acceleration ($m^3/sec^2$). $v_0$ is an initial discharge speed ($m^3/sec$).

Next, a method for calculating the initial discharge speed $v_0$ in the above formula (8) is described. A pressure loss calculated from a difference between energy of the molten material 16 close to a taphole and energy of the discharged molten material 16 and a pressure loss in the taphole calculated from the Darcy-Weisbach equation are found according to the Bernoulli's theorem. Assuming that these pressure losses are equal, the following formula (9) is derived.

[Math. 4]

$$P_{i-o} + \rho \times g \times Z_s - \frac{1}{2}\rho \times \left(\frac{V_0}{d_{th}}\right)^2 = \frac{1}{2}\lambda \times \rho \times \frac{L_{th}}{d_{th}} \times \left(\frac{V_0}{d_{th}}\right)^2 \tag{9}$$

In the above formula (9), $P_{i-o}$ is a pressure difference (atm) between an internal pressure of the vertical furnace and an atmospheric pressure. $\rho$ is a density ($kg/m^3$) of the molten material 16. g is a gravitational acceleration (9.8 $m/sec^2$). $Z_s$ is a difference (m) between a height of the molten material 16 and a height of the taphole 18 on an outlet side at the start of discharge. $d_{th}$ is a diameter (m) of the taphole 18. $\lambda$ is a coefficient of friction (–) of an inner wall of the taphole 18. $L_{th}$ is a taphole depth (m). The taphole depth is a refractory length (m) over which the molten material 16 passes when discharged through the taphole 18. $v_0$ is an initial discharge speed ($m^3/sec$).

The coefficient of friction $\lambda$ of the inner wall of the taphole 18 is found by the following formula (10) by using the Swamee-Jain equation.

[Math. 5]

$$\frac{\lambda}{4} = \frac{0.0626}{\left[\log\left(\frac{e}{3.7 \times d_{th}} + \frac{5.74}{\left(\frac{\rho \times v_0 \times d_{th}}{S_{dh} \times \mu}\right)^{0.9}}\right)\right]^2} \tag{10}$$

In the above formula (10), $\lambda$ is the coefficient of friction (–) of the inner wall of the taphole 18. e is a surface roughness (m) of the taphole inner wall. $d_{th}$ is a diameter (m) of the taphole 18. $\rho$ is a density (kg/m$^3$) of the molten material 16. $v_0$ is an initial discharge speed (m$^3$/sec). $S_{dh}$ is a cross-sectional area of the taphole 18. $\mu$ is a viscosity (Pa·s) of the molten material 16.

The internal pressure of the vertical furnace is obtained by a pressure gauge 44 provided in the tuyere 12. As the atmospheric pressure, a typical value may be used. Although the density $\rho$ and the viscosity $\mu$ of the molten material 16 are density and viscosity of the molten pig iron and slag, the density and viscosity of the slag, which is more viscous and has large influence on a pressure loss, are used in the present embodiment. As the density p of the molten material 16, a constant value (a value of a past record) may be used. The density of the molten material 16 may be calculated by using a weight ratio of FeO in molten slag by using the method described in Non Patent Literature 1. In a case where the viscosity of the molten material is estimated by the method described in Non Patent Literature 1, a temperature of the discharged molten material measured by a thermometer 45 such as a thermocouple may be used as a temperature of the molten material.

A height of the molten material 16 at the start of discharge is found by substituting an initial residual amount $V_0$ into the formula (13), which will be described later. The height of the taphole 18 on an outlet side is found by measuring the position of the taphole 18. Since the taphole 18 is bored by using a drill, the diameter $d_{th}$ of the taphole 18 is found by measuring a diameter of the drill. The taphole depth $L_{th}$ is found by measuring a length of intrusion of the drill during boring of the taphole 18.

Although the surface roughness e of the taphole inner wall varies depending on a boring method, a taphole mix, an elapsed period from the start of tapping, and the like, it has been confirmed from operation analysis that it is appropriate to use a value within a range of 0.0001 m to 0.01 m. The viscosity $\mu$ of the molten material 16 may be a constant value (0.25 Pa·s to 0.35 Pa·s). The viscosity $\mu$ of the molten material 16 may be estimated by using a method described in Non Patent Literature 2, which is a method for estimating the viscosity from concentrations and temperatures of components such as CaO, MgO, Al$_2$O$_3$, SiO$_2$, and FeO. The cross-sectional area $S_{dh}$ of the taphole 18 is found by the following formula (11) by using the diameter $d_{th}$ of the taphole 18.

$$S_{dh}=(d_{th}/2)^2 \times \pi \qquad (11)$$

The initial discharge speed $v_0$ of the molten material 16 can be found by solving the above formulas (9) and (10). The discharge acceleration a can be found by using $v_0$, an actual measurement value of the amount V of discharged molten material 16 measured by a discharge amount meter 46, an actual measurement value of the discharge period T of the molten material 16 measured by a discharge period meter 47, and the above formula (8). In a case where the initial discharge speed $v_0$ and the discharge acceleration a can be found, the discharge speed v of the molten material 16 can be continuously calculated by using the above formula (7).

A residual amount of the molten material 16 accumulated in the bottom portion of the furnace body 10 can be continuously detected from a difference between the production speed PV of the molten material 16 and the discharge speed v of the molten material 16 thus found. Specifically, a residual amount of the molten material 16 at any time t (sec) is detected by using the following formula (12) by the residual amount calculation unit 33 of the residual molten material amount detection apparatus 30.

[Math. 6]
$$V = V_0 + \int \left(PV(t) - \frac{v(t)}{\rho}\right)dt \qquad (12)$$

In the above formula (12), V is a residual amount (kg) of the molten material 16. $V_0$ is an initial residual amount (kg) of the molten material 16. PV is a production speed (kg/sec) of the molten material 16. v is a discharge speed (m$^3$/sec) of the molten material 16. $\rho$ is a density (kg/m$^3$) of the molten material 16. The initial residual amount $V_0$ is a constant value set in accordance with a capacity of the furnace body 10. Since a height of the molten material 16 in a blast furnace typically stays at a level higher by 1 m to 2 m than a taphole, the initial residual amount $V_0$ is set in accordance with the capacity of the furnace body 10 so that the height of the molten material 16 becomes 1 m to 2 m higher than the taphole. Since the residual amount V of the molten material 16 at any time can be detected by using the above formula (12), not only can the residual amount of the molten material 16 in the vertical furnace be detected at a desired timing, but also the residual amount of the molten material 16 in the vertical furnace can be continuously detected.

The residual amount of the molten material 16 in the vertical furnace can be detected at any timing by using the residual molten material amount detection method and detection apparatus for the same according to the present embodiment. This makes it possible to perform an operating action at a desired timing while using the residual amount of the molten material 16 as an index, thereby making it possible to avoid a trouble in operation of a blast furnace more than a conventional technique in which the action is performed every two to three hours. Furthermore, according to the residual molten material amount detection method and detection apparatus for the same according to the present embodiment, the residual amount of the molten material 16 can be detected without using a special sensor or camera. Therefore, an initial cost and a maintenance cost needed when a special sensor or camera is introduced are not needed, and an increase in production cost of molten pig iron can be suppressed.

Although an example in which the production speed PV of the molten material 16 is continuously detected by using the formula (1) has been described above, this is not restrictive. For example, the production speed PV of the molten material 16 may be calculated from a charging speed at which raw materials are charged through the furnace top and a component concentration of the raw materials or the production speed PV may be calculated from an amount of reductant used to produce a unit weight of molten pig iron, a component of the furnace top gas, an amount and a component of blown gas, and a degree of oxidation of the raw materials.

Next, a method for detecting the liquid level of the molten material 16 by the liquid level calculation unit 34 of the residual molten material amount detection apparatus 30 is described. The liquid level of the molten material 16 is found by using the following formula (13).

[Math. 7]
$$Z = \frac{V}{\rho \times S \times \varepsilon_{ave}} \qquad (13)$$

In the above formula (13), Z is the liquid level (m) of the molten material 16. V is an amount (kg) of the molten material 16. $\rho$ is a density (kg/m$^3$) of the molten material 16. S is a hearth cross-sectional area (m$^2$). $\varepsilon_{ave}$ is an average void fraction (−) of the solid-filled structure 14. The hearth cross-sectional area S is found from a furnace bottom diameter of the vertical furnace. As the average void fraction $\varepsilon_{ave}$, an initial value 0.4 of a void fraction $\varepsilon$ may be used when the liquid level is calculated for the first time, and a void fraction calculated by the following formula (14) or an arithmetic average of the void fraction during past approximately 10 days may be used thereafter.

Figures 3, 4:
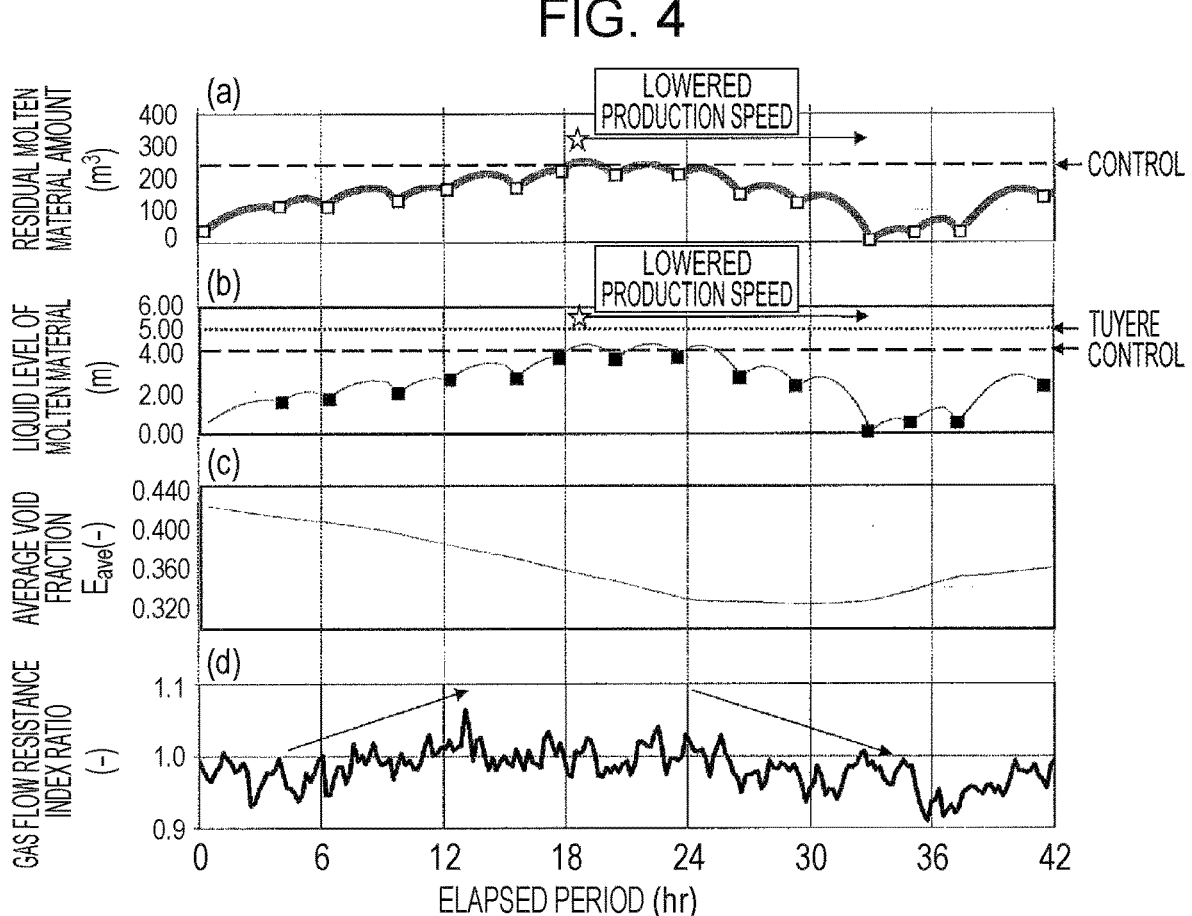
FIG. 3 is a cross-sectional view schematically illustrating the bottom portion of the blast furnace at the end of discharge.
FIG. 4 is a graph illustrating a result of an Example.

FIG. 3 is a cross-sectional view schematically illustrating the bottom portion of the blast furnace 20 at the end of discharge. As illustrated in FIG. 3, a liquid surface of the molten material 16 is inclined toward the taphole 18 due to a pressure difference between an upstream side and a downstream side in flow of molten material that is caused by liquid flow resistance occurring due to viscosity and the like of the solid-filled structure 14 and the molten material 16. In this state, a height difference $Z_f$ between the height of the taphole 18 and the liquid level Z of the molten material 16 at the end of tapping, the hearth diameter $D_h$, and an inclination angle $\theta$ of the liquid surface of the molten material 16 satisfy the following formula (14).

[Math. 8]

$$Z_f = k \times D_h \times \sin\theta = k \times D_h \times \frac{180\mu}{\rho \times g \times d_p^2} \times \frac{(1-\varepsilon)^2}{\varepsilon^3} \times \frac{v_f}{S} \qquad (14)$$

In the above formula (14), $Z_f$ is a height difference (m) between the height of the taphole 18 and the liquid level Z of the molten material 16 at the end of discharge. k is a dimensionless arbitrary constant (−) that is experimentally found. The dimensionless arbitrary constant k is found by a method described in Non Patent Literature 4. For example, in the case of a typical blast furnace, k is 7.0. $D_h$ is a hearth diameter (m). $\mu$ is a viscosity (Pa·s) of the molten material 16. $\rho$ is a density (kg/m$^3$) of the molten material 16. g is a gravitational acceleration (9.8 m/s$^2$). $d_p$ is a particle diameter (m) of the solid-filled structure 14. $\varepsilon$ is a void fraction (−) of the solid-filled structure 14. $v_f$ is a discharge speed (m$^3$/sec) of the molten material 16 at the end of discharge. S is a hearth cross-sectional area (m$^2$).

In a case where coke is charged through the furnace top of the vertical furnace, the particle diameter $d_p$ of the solid-filled structure 14 may be an average particle diameter of the coke charged through the furnace top. As described in Non Patent Literature 3, a value taking into consideration an initial particle diameter distribution of coke charged through an upper portion of the furnace and influence of a change of the particle diameter distribution caused by chemical reaction, a physical shock, or the like during fall of the coke onto the bottom portion of the furnace may be used. The discharge speed $v_f$ of the molten material 16 at the end of discharge is found by using the above formula (7).

A liquid level of the molten material 16 at the end of first discharge is calculated by using the residual amount of the molten material 16, the initial value 0.4 of the void fraction $\varepsilon_{ave}$, and the above formula (13). A height difference $Z_f$ at the end of the first discharge, that is, the inclination angle $\theta$ is calculated from this liquid level and the height of the taphole 18. A void fraction $\varepsilon$ at the end of the first discharge can be calculated by using the inclination angle $\theta$ and the above formula (14).

As described above, in the present embodiment, an inclination angle of a liquid surface of molten material is calculated from a residual amount of the molten material at the end of discharge of the molten material, and a void fraction $\varepsilon$ of a solid-filled structure close to an inner side of a discharge portion is calculated on the basis of the inclination angle. The void fraction $\varepsilon$ may be used to calculate a liquid level of the molten material 16 after the end of discharge. This updates the void fraction to one reflecting a latest furnace condition, thereby improving accuracy of detection of a liquid level of the molten material 16 calculated by using the void fraction.

It is preferable to perform an operating action for lowering the production speed of the molten material 16 in a case where the residual amount of the molten material 16 detected by using the above formula (12) or the liquid level of the molten material 16 detected by using the above formula (13) exceeds a predetermined threshold value. This makes it possible to prevent the liquid level of the molten material 16 from becoming too high, thereby avoiding occurrence of troubles such as deterioration in gas permeability and tuyere blockage with slag. The action for lowering the production speed of the molten material 16 is, for example, to reduce an amount of hot blast blown through the tuyere 12. An operating action for increasing the discharge speed of the molten material 16 may be performed instead of or together with the operating action for lowering the production speed of the molten material 16.

Furthermore, by partially changing the residual molten material amount detection method and detection apparatus for the same, a residual amount of a liquid contained not only in a blast furnace or a vertical furnace, but also in any container having a solid-filled structure therein can be detected. That is, a residual amount of a liquid remaining in a bottom portion of a container can be detected after the liquid contained in the container so as to infiltrate voids in at least a part of the solid-filled structure is discharged through a discharge hole provided in a lower portion of the container.

Specifically, a residual liquid amount detection apparatus 30 according to the present embodiment includes a supply speed acquisition unit 31 that acquires a supply speed of a liquid, a discharge speed acquisition unit 32 that acquires a discharge speed of the liquid, and a residual amount calculation unit 33 that calculates a residual amount of the liquid, as with the residual molten material amount detection apparatus 30. This residual liquid amount detection apparatus 30 further includes a liquid level calculation unit 34 that detects a liquid level of the liquid after the end of discharge.

The supply speed acquisition unit 31 acquires a supply speed of the liquid in a similar manner to the production speed acquisition unit 31 of the residual molten material amount detection apparatus 30. Furthermore, the discharge speed acquisition unit 32 acquires a discharge speed of the liquid by a similar manner to the discharge speed acquisition unit 32 of the residual molten material amount detection apparatus 30. Furthermore, the residual amount calculation unit 33 calculates a residual amount of the liquid by using a difference between the supply speed of the liquid and the discharge speed of the liquid thus calculated in a similar manner to the residual amount calculation unit 33 of the residual molten material amount detection apparatus 30. In addition, the liquid level calculation unit 34 calculates a void fraction of the solid-filled structure by using an inclination angle of a liquid surface of the liquid at the end of discharge of the liquid through the discharge hole in a similar manner to the liquid level calculation unit 34 of the residual molten material amount detection apparatus 30. Then, the liquid level of the liquid after the end of discharge is detected by using the calculated void fraction and the residual amount of the liquid after the end of discharge.

The residual liquid amount detection method and detection apparatus for the same according to the present embodiment are applicable not only to a blast furnace process, but also to any process in any container having a solid-filled structure therein in which a liquid is contained so as to infiltrate voids in at least a part of the solid-filled structure.

EXAMPLES

Next, an Example is described. In the present Example, the above formulas (1) and (7) were calculated by using operation conditions and measurement values in operation of a blast furnace, and the above formula (12) was calculated from the formulas (1) and (7). A residual amount of molten material during operation of the blast furnace was detected every minute by using the formula (12). Furthermore, a liquid level of the molten material was detected from the detected residual amount of the molten material every minute by using the formula (13), and an average void fraction Save of a solid-filled structure used in the formula (13) was calculated every time discharge ends by using the above formula (14).

Not only was the residual amount of the molten material detected, but also gas flow resistance index K during operation of the blast furnace was calculated. The gas flow resistance index K is a typical index for evaluating gas permeability of the vertical furnace and is calculated by the following formula (15).

[Math. 9]
$$K = \frac{((1033Pb)^2 - (1033Pt)^2)}{(BV \times 60)^{1.7}} \quad (15)$$

In the above formula (15), $P_b$ is a blast pressure (atm) of hot blast blown through a tuyere. $P_t$ is a discharge pressure (atm) of the furnace top gas. BV is an amount ($Nm^3$/sec) of hot blast blown through the tuyere.

A gas flow resistance index ratio $K_r$ is a value calculated by the following formula (16) where $K_{ave}$ is an average gas flow resistance index of a target vertical furnace.

[Math. 10]
$$K_r = \frac{K}{K_{ave}} \quad (16)$$

FIG. 4 is a graph illustrating a result of the present Example. FIG. 4(a) is a graph illustrating a fluctuation of a residual amount ($m^3$) of molten material. The white rectangles in FIG. 4(a) indicate a residual amount of the molten material detected by measurement performed every discharge operation. The dashed line in FIG. 4(a) indicates a control value of the residual amount of the molten material.

FIG. 4(b) is a graph illustrating a fluctuation of a liquid level of the molten material. The black rectangles in FIG. 4(b) indicate a liquid level of the molten material detected by measurement performed every discharge operation. The dashed line in FIG. 4(b) indicates a control value of the molten material liquid level, and the dotted line indicates a height of the tuyere. That is, a position lower than the height of the tuyere is set as the control value of the molten material liquid level so that the liquid level of the molten material does not reach the position of the tuyere. FIG. 4(c) is a graph illustrating a fluctuation of an average void fraction $\varepsilon_{ave}$ (−). The average void fraction $\varepsilon_{ave}$ (−) is a moving average of $\varepsilon$ in one day. FIG. 4(d) is a graph illustrating a fluctuation of a gas flow resistance index ratio (−).

As illustrated in FIGS. 4(a) and 4(b), the residual amount of the molten material increased until 20 hours elapsed. The liquid level of the molten material also increased corresponding to the increase in residual amount of the molten material. After elapse of 18 hours, an operating action for lowering a production speed of molten pig iron was performed since the residual amount of the molten material and the liquid level of the molten material exceeded the control values. Accordingly, after elapse of 20 hours, the residual amount of the molten material started to decrease, and the liquid level of the molten material also decreased accordingly. As illustrated in FIG. 4(c), the average void fraction of the filled structure decreased in accordance with the increase in residual amount of the molten material and then decreased in accordance with the decrease in residual amount of the molten material, and started to rise after the residual amount of the molten material illustrated in FIG. 4(b) became 0.

As illustrated in FIG. 4(d), the gas flow resistance index ratio rose in accordance with the increase in molten material amount and the rise in liquid level of the molten material. The rise in gas flow resistance index ratio means a decrease in furnace gas permeability, and therefore when the gas flow resistance index ratio rises, blast furnace operation becomes unstable. However, since the residual amount of the molten material was decreased by performing an operating action for lowering the production speed of the molten material after elapse of 18 hours, the gas flow resistance index ratio decreased, and stable operation of the blast furnace was realized.

On the other hand, in a case where the residual amount of the molten material is detected every discharge operation, the residual amount of the molten material increased markedly after elapse of 18 hours and before elapse of 21 hours, and there was a risk that the liquid level of the molten material reached the position of the tuyere. Even when the liquid level of the molten material does not reach the position of the tuyere, the gas flow resistance index ratio rises markedly, and operation of the blast furnace becomes unstable, and therefore stable operation of the blast furnace cannot be realized.

As described above, according to the residual molten material amount detection method and detection apparatus for the same according to the present embodiment, a residual amount of molten material in a vertical furnace can be detected at any timing, and therefore an operating action using the residual amount of the molten material as an index can be performed at a desired timing. This makes it possible to avoid troubles in operation of a blast furnace more than a conventional technique in which a residual amount of molten material is detected every discharge operation, thereby realizing stable operation of the blast furnace. Furthermore, since a residual amount of molten material can be detected without using a special sensor or camera, an initial cost and a maintenance cost needed when a special sensor or camera is introduced are not needed, and therefore an increase in production cost of molten pig iron can be suppressed.

The invention claimed is:

1. A residual liquid amount detection method for detecting a residual amount of a liquid remaining in a bottom portion of a container after the liquid is discharged through a discharge hole provided in a lower portion of the container, the container being filled with a solid so that a solid-filled structure is formed and the liquid being contained in the container so as to infiltrate voids in at least a part of the solid-filled structure, the residual liquid amount detection method comprising:

detecting the residual amount of the liquid based on a difference between a supply speed of the liquid and a discharge speed of the liquid that is calculated from a discharge acceleration, a discharge period, and an initial discharge speed of the discharge of the liquid through the discharge hole.

2. The residual liquid amount detection method according to claim 1, further comprising:

calculating a void fraction of the solid-filled structure based on an inclination angle of a liquid surface of the liquid at an end of the discharge of the liquid through the discharge hole; and detecting a liquid level of the liquid after the end of the discharge based on the calculated void fraction and the residual amount of the liquid after the end of the discharge.

3. A residual molten material amount detection method for detecting a residual amount of molten material remaining in a bottom portion of a vertical furnace after an end of discharge of the molten material, the vertical furnace generating high-temperature reducing gas by burning carbon by using oxygen-containing gas blown through a lower portion of the vertical furnace, producing the molten material by causing the high-temperature reducing gas to melt and reduce an iron source raw material that is charged through a furnace top of the vertical furnace and forms a solid-filled structure in the vertical furnace, and discharging the molten material through a taphole of the vertical furnace, the residual molten material amount detection method comprising:

detecting the residual amount of the molten material based on a difference between a production speed of the molten material and a discharge speed of the molten material that is calculated from a discharge acceleration, a discharge period, and an initial discharge speed of the discharge of the molten material through the taphole.

4. The residual molten material amount detection method according to claim 3, further comprising:

calculating a void fraction of the solid-filled structure based on an inclination angle of a liquid surface of the molten material at the end of the discharge of the molten material through the taphole; and detecting a liquid level of the molten material after the end of the discharge based on the calculated void fraction and the residual amount of the molten material after the end of the discharge.

5. A method for operating a vertical furnace, the method comprising, in a case where the liquid level detected by the residual molten material amount detection method according to claim 4 exceeds a predetermined threshold value, performing at least one of an operating action for lowering the production speed of the molten material and an operating action for increasing the discharge speed of the molten material.

6. A residual liquid amount detection apparatus for detecting a residual amount of a liquid remaining in a bottom portion of a container after the liquid is discharged through a discharge hole provided in a lower portion of the container, the container being filled with a solid so that a solid-filled structure is formed and the liquid being contained in the container so as to infiltrate voids in at least a part of the solid-filled structure, the residual liquid amount detection apparatus comprising:

a supply speed acquisition unit that acquires a supply speed of the liquid;

a discharge speed acquisition unit that acquires a discharge speed of the liquid from a discharge acceleration, a discharge period, and an initial discharge speed of the discharge of the liquid through the discharge hole; and a residual amount calculation unit that calculates the residual amount of the liquid based on a difference between the supply speed of the liquid and the discharge speed of the liquid.

7. The residual liquid amount detection apparatus according to claim 6, further comprising a liquid level calculation unit that calculates a void fraction of the solid-filled structure based on an inclination angle of a liquid surface of the liquid at an end of the discharge of the liquid through the discharge hole and detects a liquid level of the liquid after the end of the discharge based on the calculated void fraction and the residual amount of the liquid after the end of the discharge.

8. A residual molten material amount detection apparatus for detecting a residual amount of molten material remaining in a bottom portion of a vertical furnace after an end of discharge of the molten material, the vertical furnace generating high-temperature reducing gas by burning carbon by using oxygen-containing gas blown through a lower portion of the vertical furnace, producing the molten material by causing the high-temperature reducing gas to melt and reduce an iron source raw material that is charged through a furnace top of the vertical furnace and forms a solid-filled structure in the vertical furnace, and discharging the molten material through a taphole of the vertical furnace, the residual molten material amount detection apparatus comprising:

a production speed acquisition unit that acquires a production speed of the molten material;

a discharge speed acquisition unit that acquires a discharge speed of the molten material from a discharge acceleration, a discharge period, and an initial discharge speed of the discharge of the molten material through the taphole; and a residual amount calculation unit that calculates the residual amount of the molten material based on a difference between the production speed of the molten material and the discharge speed of the molten material.

9. The residual molten material amount detection apparatus according to claim 8, further comprising a liquid level calculation unit that calculates a void fraction of the solid-filled structure based on an inclination angle of a liquid surface of the molten material after the end of the discharge of the molten material through the taphole and detects a liquid level of the molten material after the end of the discharge based on the calculated void fraction and the residual amount of the molten material after the end of the discharge.

10. A residual liquid amount detection apparatus for detecting a residual amount of a liquid remaining in a bottom portion of a container after the liquid is discharged through a discharge hole provided in a lower portion of the container, the container being filled with a solid so that a solid-filled structure is formed and the liquid being contained in the container so as to infiltrate voids in at least a part of the solid-filled structure, the residual liquid amount detection apparatus comprising a processor configured to execute the steps of:

acquiring a supply speed of the liquid;

acquiring a discharge speed of the liquid from a discharge acceleration, a discharge period, and an initial discharge speed of the discharge of the liquid through the discharge hole; and calculating the residual amount of the liquid based on a difference between the supply speed of the liquid and the discharge speed of the liquid.

11. A residual molten material amount detection apparatus for detecting a residual amount of molten material remaining in a bottom portion of a vertical furnace after an end of discharge of the molten material, the vertical furnace generating high-temperature reducing gas by burning carbon by using oxygen-containing gas blown through a lower portion of the vertical furnace, producing the molten material by causing the high-temperature reducing gas to melt and reduce an iron source raw material that is charged through a furnace top of the vertical furnace and forms a solid-filled structure in the vertical furnace, and discharging the molten material through a taphole of the vertical furnace, the residual molten material amount detection apparatus comprising a processor configured to execute the steps of:

acquiring a production speed of the molten material;

acquiring a discharge speed of the molten material from a discharge acceleration, a discharge period, and an initial discharge speed of the discharge of the molten material through the taphole; and calculating the residual amount of the molten material based on a difference between the production speed of the molten material and the discharge speed of the molten material.

* * * * *